United States Patent
Offer

(10) Patent No.: US 6,954,630 B2
(45) Date of Patent: Oct. 11, 2005

(54) METHOD FOR LOCATION-BASED BILLING FOR MOBILE COMMUNICATION

(75) Inventor: Gero Offer, Stuttgart (DE)

(73) Assignee: Siemens Aktiengesellschaft, Munich (DE)

( * ) Notice: Subject to any disclaimer, the term of this patent is extended or adjusted under 35 U.S.C. 154(b) by 134 days.

(21) Appl. No.: 10/319,319

(22) Filed: Dec. 13, 2002

(65) Prior Publication Data

US 2003/0114141 A1 Jun. 19, 2003

(30) Foreign Application Priority Data

Dec. 13, 2001 (EP) .............................. 01129747

(51) Int. Cl.⁷ .............................................. H04M 11/00
(52) U.S. Cl. .................... 455/406; 455/407; 455/435.1; 455/456.3; 455/456.5
(58) Field of Search ................ 455/406, 407, 455/408; 379/11, 112.01, 112.06, 114.01, 114.05, 114.1, 114.12, 115.01, 121.01, 121.02

(56) References Cited

U.S. PATENT DOCUMENTS

| | | | |
|---|---|---|---|
| 5,568,153 A | 10/1996 | Beliveau ..................... 324/357 |
| 5,594,777 A | 1/1997 | Makkonen et al. | |
| 5,670,950 A | 9/1997 | Otsuka ................. 340/825.33 |
| 5,758,288 A | * | 5/1998 | Dunn et al. ............... 455/456.5 |
| 5,774,802 A | * | 6/1998 | Tell et al. .................... 455/408 |
| 5,787,354 A | * | 7/1998 | Gray et al. .............. 455/456.1 |
| 5,943,332 A | * | 8/1999 | Liu et al. .................... 370/342 |
| 5,949,770 A | * | 9/1999 | Liu et al. .................... 370/329 |
| 6,002,679 A | * | 12/1999 | Liu et al. .................... 370/335 |
| 6,018,652 A | | 1/2000 | Frager et al. ............... 455/406 |
| 6,023,618 A | | 2/2000 | Janhonen et al. ........... 455/406 |
| 6,044,261 A | * | 3/2000 | Kazmi ........................ 455/408 |
| 6,256,504 B1 | * | 7/2001 | Tell et al. ................ 455/456.2 |
| 6,327,466 B1 | * | 12/2001 | Savolainen ................. 455/407 |
| 6,393,288 B1 | * | 5/2002 | Sollee et al. ................ 455/445 |
| 6,640,096 B1 | * | 10/2003 | Alho et al. .................. 455/406 |

FOREIGN PATENT DOCUMENTS

| | | | | |
|---|---|---|---|---|
| DE | 197 31 461 C1 | 12/1998 | ........... H04Q/7/36 |
| DE | 197 31 463 C1 | 12/1998 | ........... H04Q/7/36 |
| EP | 0 073 144 A2 | 3/1983 | ........... H01L/27/14 |
| EP | 0 597 638 A1 | 5/1994 | ........... H04Q/7/04 |
| WO | 93/03585 | 2/1993 | ........... H04Q/7/04 |
| WO | 99/56326 | 11/1999 | ........... H01L/41/00 |

* cited by examiner

*Primary Examiner*—Binh K. Tieu
(74) *Attorney, Agent, or Firm*—Laurence A. Greenberg; Werner H. Stemer; Ralph E. Locher

(57) ABSTRACT

A method for location-based billing for mobile telecommunication is described in this application. In this context, subscribers communicating on a mobile basis are subject to separate billing within a special billing zone as soon as a network server establishes that the mobile stations belonging to the subscribers are present within this zone at the same time.

10 Claims, 4 Drawing Sheets

METHOD FOR LOCATION-BASED BILLING FOR MOBILE COMMUNICATION

BACKGROUND OF THE INVENTION

Field of the Invention

The invention relates to a method for location-based billing for mobile telecommunication.

In recent years, mobile telecommunication, particularly mobile telephony both in the private everyday life of users and within the context of managing business or organizational tasks, has become very important. This is particularly due to the increasing mobility of the users of this communication method and also to the increasing flexibility and mobilization of operational processes. Companies that were previously located permanently at one site and were thus able to organize internal procedures and management tasks using a landline network at a fixed location increasingly have access to a team of employees, working in the service sector and hence working externally, that is mobile and hence also needs to be able to be reached on a mobile basis.

This is where mobile telecommunication comes into play. Compared with the already customary internal or in-house landline network, however, mobile telecommunication has a few serious drawbacks.

The first drawback concerns the increased switching complexity of mobile communication connections as compared with the conventional internal landline network at a fixed site. While a landline network located in a business or organizational division involves all calls or other communication between subscribers being handled essentially via an exchange which is preferably within the business, and hence a simple overview of the subscribers registered within the local landline network is provided, this is not the case with a mobile telecommunication network. In such a network, all registration and communication procedures take place via a network server which is generally not located within the business and which also needs to set up connections between mobile stations that belong to subscribers who are not part of a company or organizational structure. In addition, a mobile telecommunication network based on the current prior art is not able to cover a geographically local site area belonging to a company or other organization as well as a conventional internal landline network at a fixed site.

The advantage of mobility is thus achieved through the drawback of imprecise site coverage.

However, even mobile telecommunication, for example, for a company's external workforce, cannot presently be handled internally, as is the case in in-house landline networks, since there is at present no possibility of identifying pure internal communication as such to the network server. As alternatives up to now, there thus remain either the procurement of certain numbers of mobile stations (essentially mobile phones) by a company, registering the individual call-numbers of the mobile stations by the network server and the company, or using the private mobile stations of the employees who work for the company for mobile communication. Both current solutions entail an enormous increase in management tasks either for the network server or for the company or for both at the same time.

To localize mobile telecommunication to a clearly defined geographical area for a business division, the current prior art has already provided known approaches to a solution. In published and abandoned U.S. patent application Ser. No. 09/247,594 filed by Siemens, location-based billing is described.

In this case, a plurality of radio cells managed by the network server are logically combined to form a home area, and localizing a subscriber's mobile station involves applying prearranged billing for communication either within this home area or outside of this home area.

International Patent Application PCT/DE98/01958 filed by Siemens, discloses a method using a subscriber-specific combination of radio cells to form tariff zones, such as office zones, city zones or home zones, which is based on a comparison of the current localization of the subscriber in question in a radio cell with predefined radio cells which are managed by the network server and are combined to form the aforementioned tariff zones. If the subscriber and his mobile station are within the zonal range agreed by him with the network server, separate billing is applied.

Both methods known from the prior art do not solve the actual problem, however.

SUMMARY OF THE INVENTION

It is accordingly an object of the invention to provide a method for location-based billing of a collection of mobile stations in a mobile telecommunication network which overcomes the above-mentioned disadvantages of the prior art methods of this general type.

With the foregoing and other objects in view there is provided, in accordance with the invention, a method for location-based billing for mobile telecommunication. The method includes: registering mobile stations in a cellular mobile radio network formed by base stations and a network server including at least call-processing facilities, facilities for sending/receiving information, and a billing facility; recording, forwarding, and transmitting communication information between the mobile stations and/or between the mobile stations and a network server; forming a special billing zone by combining a subset of radio cells associated with base stations in the cellular mobile radio network and covering a geographical area; and using the billing facility to bill, based on a locally valid tariff for the special billing zone, for communication between ones of the mobile stations temporally concurrently localized within the special billing zone.

In accordance with an added feature of the invention, the method includes: providing a zone register having a collection of cell identifiers defining the special billing zone; and using the network server to manage the zone register and to check whether the ones of the mobile stations are located within the special billing zone by comparing current cell identifiers for the ones of the mobile stations with the zone register.

In accordance with an additional feature of the invention: after establishing that a first mobile station is localized within the special billing zone and after the first mobile station initiates a connection setup over the mobile communication network to a second mobile station localized within the special billing zone, the network server sends a confirmation indicating that the second mobile station is located within the special billing zone.

In accordance with another feature of the invention, the method includes indicating the confirmation visually and/or audibly on at least one of the first mobile station and the second mobile station.

In accordance with a further feature of the invention, when a first mobile station and a second mobile station are currently involved in a communication and one of the first mobile station and the second mobile station is leaving the special billing zone, sending a notification selected from a group consisting of a visual signal, an audible signal, a text message, and a voice message to at least one of the first mobile station and the second mobile station.

In accordance with a further added feature of the invention, if the special billing zone is left during an ongoing communication between a first mobile station and a second mobile station, insuring that the billing facility maintains a tariff associated with the special billing zone at least until the ongoing communication has ended.

In accordance with another added feature of the invention, when a given mobile station undergoes a registration procedure within the special billing zone, insuring that the given mobile station stores a zone identifier as evidence of the registration procedure.

In accordance with another additional feature of the invention, when the given mobile station registers again, then either the network server requests the zone identifier stored by the given mobile station, or the given mobile station initiates transmission of the zone identifier to the network server.

In accordance with yet an added feature of the invention, communication is enabled between at least two mobile stations based on a tariff associated with the special billing zone irrespective of a current localization of the two mobile stations—provided that at least one of the two mobile stations has transmitted a zone identifier to the network server.

In accordance with yet an additional feature of the invention, the zone identifier is provided with a periodic validity or with a validity having a time limit.

In accordance with yet another feature of the invention, the given mobile station prescribes the zone identifier without being initialized by the registration procedure.

In accordance with yet a further feature of the invention, the given mobile station stores the zone identifier on a subscriber identification module.

In particular, it is an object of the invention to specify a method for location-based billing of a collection of mobile stations in a mobile telecommunication network taking account of the mobility of the subscribers such that the network server can use the simplest way possible to associate the subscribers' mobile stations with this collection irrespective of their specific whereabouts. This does not involve searching for a subscriber-specific method, but rather searching for one that replaces the business-based or organization-based landline network entirely on the basis of mobile telecommunication and adds the mobile telecommunication network's fundamental advantage of the mobility of all subscribers to internal communication.

In line with the invention, the communication between two mobile stations is billed for on the basis of a separate special billing zone as soon as simultaneous registration of the two mobile stations within the special billing zone has been established by the network server.

The geographical special billing zone is agreed with a network server in advance by a company employing the two subscribers or by a comparable organization. The special billing zone is formed in a manner known per se by the logical combination of already existing radio cells within a network server. A special billing zone is assigned a billing tariff agreed to in advance between the company/organization and the network server. In line with the invention, the special billing zone is agreed not for every mobile station separately but rather concertedly for a collection of mobile stations belonging to mobile subscribers, for example, for a company's employees working at a particular site. The company or organizational division geographically associated with the special billing zone does not have to be cohesive, but rather can also include an array of physically separate sites.

All of the communication procedures taking place between mobile stations located in the special billing zone are billed for by the network server in accordance with a locally valid tariff associated with the special billing zone.

The network server continually checks for the presence of a mobile station belonging to a subscriber within the special billing zone. To this end, the current cell identifier of a subscriber's mobile station is compared with a zone register managed by the network server. The zone register contains all the radio cells defining the special billing zone. If the network server locates a mobile station belonging to a subscriber in a radio cell that is shown within the zone register, the mobile station in question is regarded as being localized within the special billing zone.

Both when a mobile station registers within the special billing zone and when it connects to another mobile station which is likewise localized within the special billing zone, at least one mobile station receives confirmation from the network server about localization within the special billing zone. The subscriber in question is thus provided with the information that the communication he effects using his mobile station is subject to the separate billing. At the same time, this serves as an external identifier for the subscriber indicating that in-house communication is currently in progress.

This confirmation can be indicated both visually and audibly or in combination on the mobile stations belonging to the subscribers in question. Visual confirmation can be given on a display on the mobile station, particularly by virtue of the network server transmitting a short message or a symbol. The confirmation can be given audibly by a special form of ring tone on the mobile station, for example.

Since the communicating subscribers do not keep their mobile stations at fixed locations within a mobile telecommunication network, subscribers leave the special billing zone as they move about. When this happens, the network server localizes the mobile station of the subscriber in question in a radio cell which is not shown in the zone register. In this case, the network server initiates transmission of a notification or warning to the respective mobile station. If one of the two mobile stations leaves the special billing zone during ongoing communication, the network server can transmit a notification and/or warning to both of the communicating mobile stations.

In particular, visual signals, for example on the respective mobile station's display, or transmission of a short message or of a voice message faded into communication in progress are used as an identifier for the subscriber indicating transmission of the notification and/or warning.

When one of the two currently communicating subscribers leaves the special billing zone, the separate billing can be dispensed with and the normal tariff can be applied to the rest of the communication in progress.

As one advantageous refinement, it is possible for the separate billing to be maintained until the communication between the mobile stations is complete. This is expedient particularly when the special billing zone covers a geographically unfavorable terrain. Since the radio cells combined to form the special billing zone are generally not entirely congruent with respect to the actually existing geographical area and can sometimes extend beyond it, it is preferable to select the set of radio cells, which are logically combined by the network server to form the special billing zone, to be smaller than the actual existing geographical area.

If a subscriber now leaves the special billing zone during communication which is in progress, but the subscriber leaving the special billing zone and his associated mobile station are still in the region geographically associated with the special billing zone, the separate billing which persists ensures that the congruence between the separate billing zone and the corresponding geographical region can be made flexible within certain limits, while mobile stations localized outside the geographical region are not unintentionally part of the special billing zone.

As a further refinement of the inventive method, the registration of the mobile station within the special billing zone involves the mobile station storing a zone identifier regarding the registration of the mobile station in question within the special billing zone. In this way, the mobile station is provided with a clear association relating to an affiliation with the special billing zone, which simplifies a renewed registration and localization procedure by the network server, in particular.

Renewed registration involves transmitting the zone identifier from the mobile station to the network server or involves the network server requesting the zone identifier from the mobile station. It thus becomes possible to associate the mobile station in question with the special billing zone, since the zone identifier allows a clear, call-number-independent association with the mobile station irrespective of the actual localization of the mobile station. A subscriber who is not constantly within the predominantly geographically defined special billing zone is provided with the option of mobile communication at the separate billing tariff.

This means that the options for mobile communication are combined with a clear association between the mobile station in question or the subscriber in question and a company and/or other organization that can be implemented particularly without call-number dependency.

The zone identifier's validity can be limited depending on the requirements that exist. It can thus be valid continuously and without any time limit, can have continuous validity but with a time limit, or can have a validity which has no time limit but which is not continuous. It is thus possible, for example, for mobile employees in a company to use their personal mobile station to communicate with other employees in the same company on business matters during their work time, whereas, when their nominal work time has ended, the normal tariff in the mobile telecommunication network is valid for all further private calls.

In another refinement of the inventive method, the zone identifier can also be firmly prescribed within the mobile stations without any initializing registration procedure taking place. In this case, the company in question and/or the organization in question has clearer control over the subscribers communicating on the basis of the separately agreed tariff associated with the special billing zone by virtue of the company in question either making the corresponding mobile stations available or allowing corresponding memory devices within the mobile station to be modified.

It is therefore found to be particularly expedient to store the zone identifier on the subscriber identification module, the SIM. By issuing special SIM cards that are set up to store the zone identifier, it is possible to obtain precise control over the mobile stations that are in use.

Other features which are considered as characteristic for the invention are set forth in the appended claims.

Although the invention is illustrated and described herein as embodied in a method for location-based billing for mobile communication, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
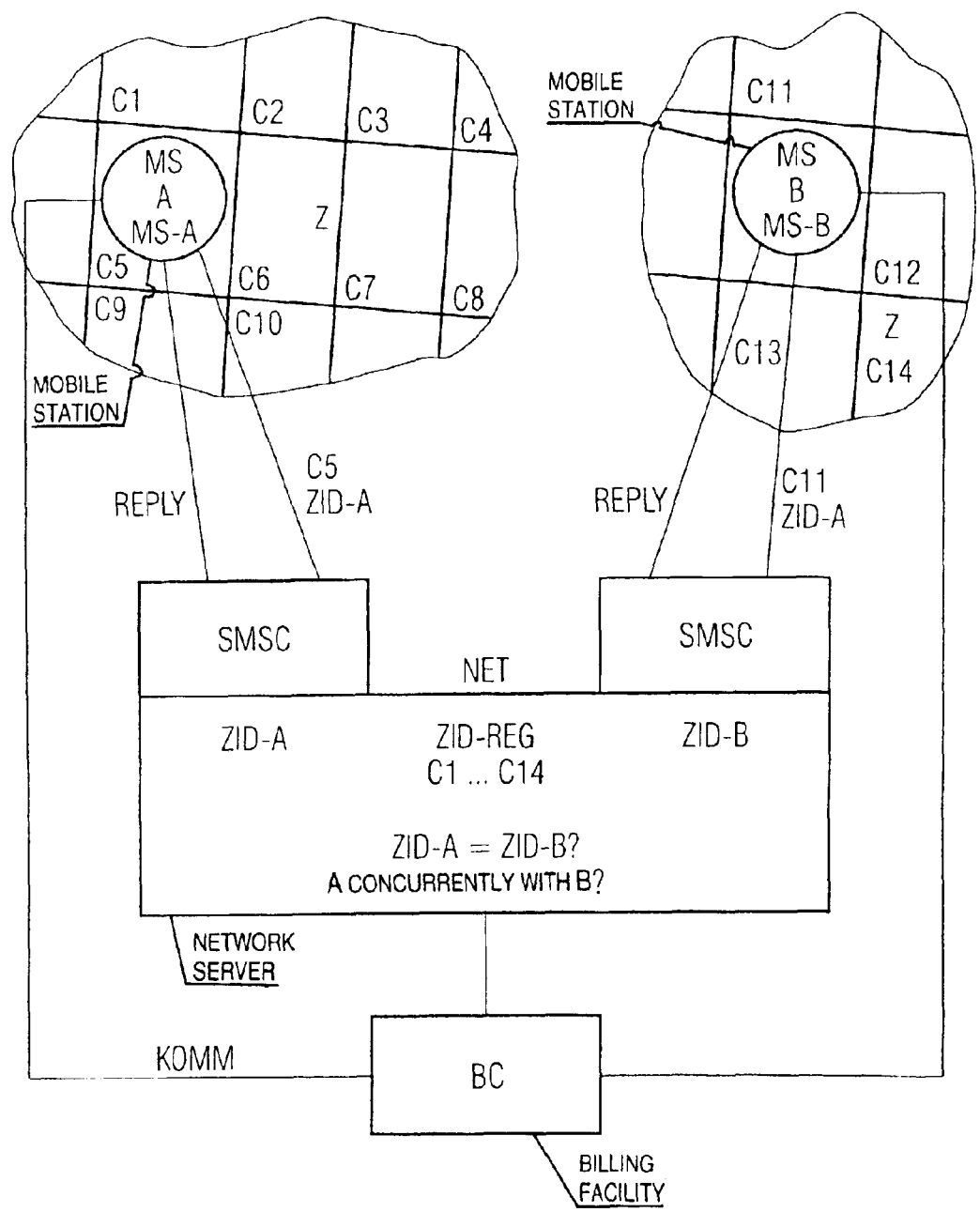
FIG. 1 is a schematic illustration showing an overview of an inventive billing method for communication between mobile stations MS-A and MS-B belonging to two subscribers A and B.

Referring now to the figures of the drawing in detail and first, particularly, to FIG. 1 thereof, there is shown a general overview of a form of the inventive billing method. At least two subscribers A and B equipped with mobile stations MS-A and MS-B are located within a predefined special billing zone Z agreed with the network server NET by A and B. This special billing zone includes cells C, labeled C1 ... C14 in FIG. 1 by way of example, which are defined by the network server NET using reception and transmission devices and are coupled thereto. Through the combination of appropriate cells C, the agreed special billing zone Z covers a geographically defined region which can be associated with a territory of company sites, for example, in which the two subscribers A and B are employed. For this reason, the special billing zone Z can be in a form such that it includes an area which is not geographically cohesive.

The communicating subscribers A and B are equipped with mobile stations MS which are in a form which is known per se. These can be either mobile telephones based on the known prior art or other devices suitable for mobile data transmission.

The mobile stations MS have registered in the mobile communication network of the network server NET in the known manner. The network server NET manages a zone register ZID-REG internally which includes a catalog of all the previously agreed cells C1 ... C14 associated with the special billing zone Z. During the registration procedure, the mobile stations MS-A and MS-B belonging to the subscribers A and B are localized in a manner which is known per se and their presence within the separate billing zone Z is checked by comparing their cell identification with the zone register ZID-REG managed by the network server NET.

If the network server NET establishes that the respectively registered mobile station MS is present within the special billing zone Z, a reply REPLY from the network server NET is sent to the mobile station MS belonging to a respective subscriber with confirmation of his presence within the special billing zone Z. Expediently, the reply REPLY can be sent using the appropriate short message service SMSC of the network server NET. The reply REPLY can be output on the mobile stations MS belonging to the corresponding subscribers using an audible or visual signal, for example.

If one of the subscribers A or B initiates communication KOMM and A and B are localized within Z, there is separate billing, agreed with the network server NET, for the communication KOMM between the mobile stations MS belonging to the subscribers A and B.

The sole criterion for separate billing for mobile communication between the mobile stations belonging to the subscribers A and B is that they have been identified by the network server NET as being localized within the special billing zone Z. The billing tariff agreed separately with the network server NET can thus be used for any subscriber A and B who is within the special billing zone Z, provided that his current cell CA and his communication partner's cell CB are shown within the zone register ZID-REG. If, by way of example, the zone Z covers the territory of a company or of a large event, separate billing according to a zone tariff in the billing facility BC becomes effective for any communication KOMM between mobile stations MS which are situated within the company or the large event. This relates particularly to people who do not work for a company and to all visitors and participants at a large event.

Another advantageous refinement of the inventive billing method takes into account the mobility of the subscribers A and B and also the lack of congruity between the special billing zone Z and the geographical region covered by it.

Figure 2:
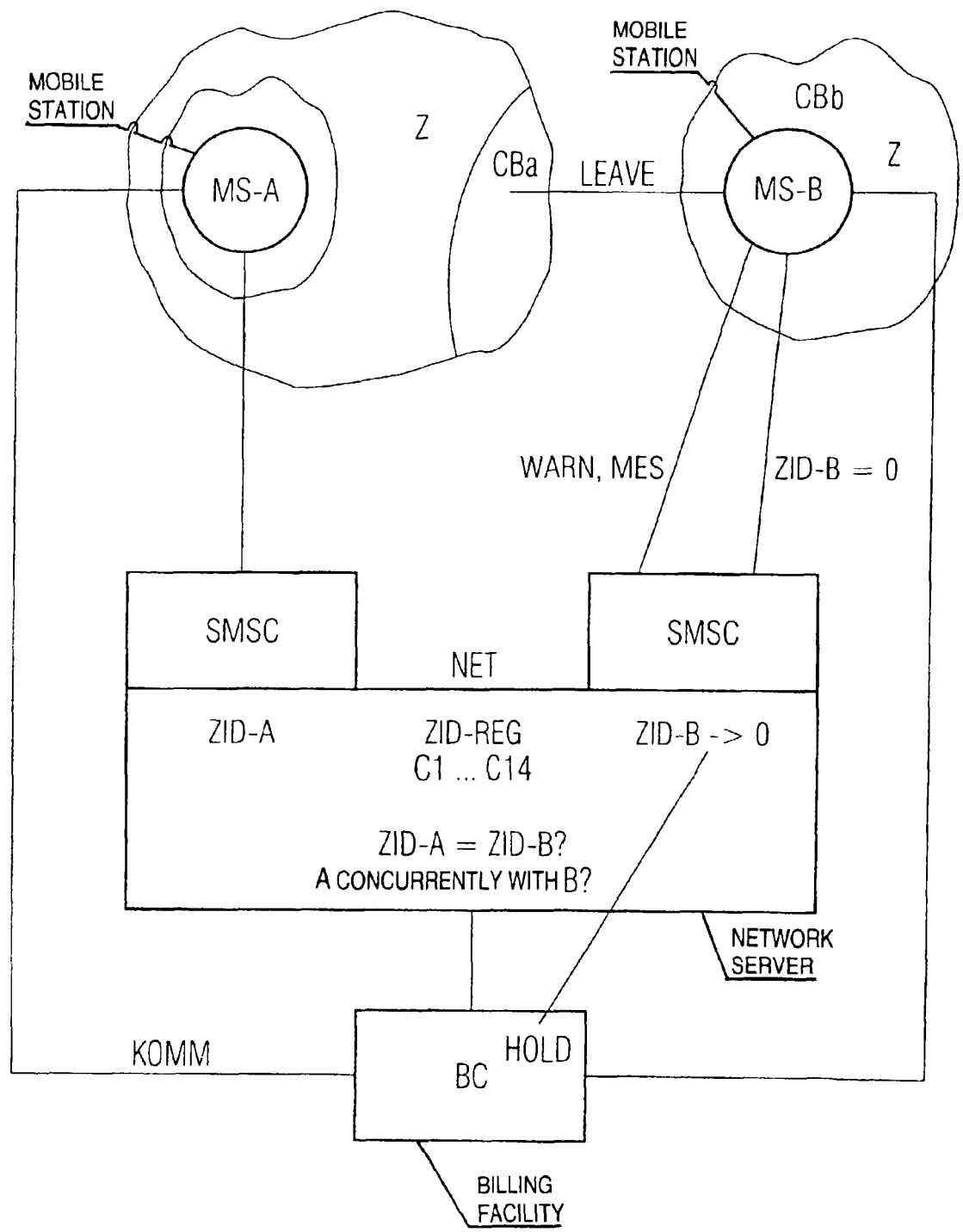
FIG. 2 is a schematic illustration showing a LEAVE process for the subscriber B with his mobile station MS-B.

This advantageous refinement is explained in more detail in FIG. 2. In line with the schematic illustration in FIG. 2, a subscriber A is localized within the special billing zone Z, while subscriber B has registered within the special billing zone Z, and during communication with A, leaves the special billing zone Z using a procedure denoted by LEAVE in FIG. 2. This procedure involves subscriber B changing over from a cell Cba associated with the special billing zone Z to a cell CBb which is not shown within the zone register ZID-REG on the network server NET. The subscriber B is thus no longer localized within Z, and his zone localization ZID-B has ceased to exist. When this is established by the network server NET, one alternative is for a warning WARN to be sent to the mobile station MS belonging to the subscriber B and to trigger a visual and/or audible signal on appropriate devices in the mobile station MS. Another alternative is that a voice message MES can additionally be faded into the communication KOMM which is currently in progress on the mobile station MS. The message indicates to subscriber B that the special billing zone Z has been left, and thus recommends that he return to Z.

The rest of the communication can then be continued at a normal tariff without the separately agreed billing.

Alternatively, however it is also possible to transmit a HOLD signal to the billing facility BC in connection with the LEAVE procedure established by the network server NET. By transmitting HOLD, the billing facility BC can be instructed to maintain the separate billing associated with the special billing zone Z until the communication procedure KOMM has ended.

This refinement of the inventive billing method takes into account the mobility of the subscribers A and B, and also the inexact congruence between the cell structure of the mobile communication network and the actual boundary of a geographical territory. Using the HOLD function, it is possible to associate a core region of a geographical area with a cell structure whose placement within this area is certain, while limited breaching and leaving of the defined zonal area Z also continues to be possible during mobile communication. This refinement is very advantageous particularly when the actual geographical region can be delimited only with difficulty or inexactly by a special billing zone Z using a cell structure.

In the case of another refinement of the inventive billing method, provision is made for mobile zone association for the respective subscribers in connection with a registration procedure. This is explained in more detail in FIG. 3 and FIG. 4.

The communicating subscribers A and B are, in principle, mobile and can freely choose their whereabouts. In addition, they can be associated with a separate billing zone Z not only by geographical combination, but also by logistical procedures, membership of an organization, or such further associations. In this case, "mobile" zone affiliation comes into play, and is taken into account by the refinements of the inventive method below.

Figure 3:
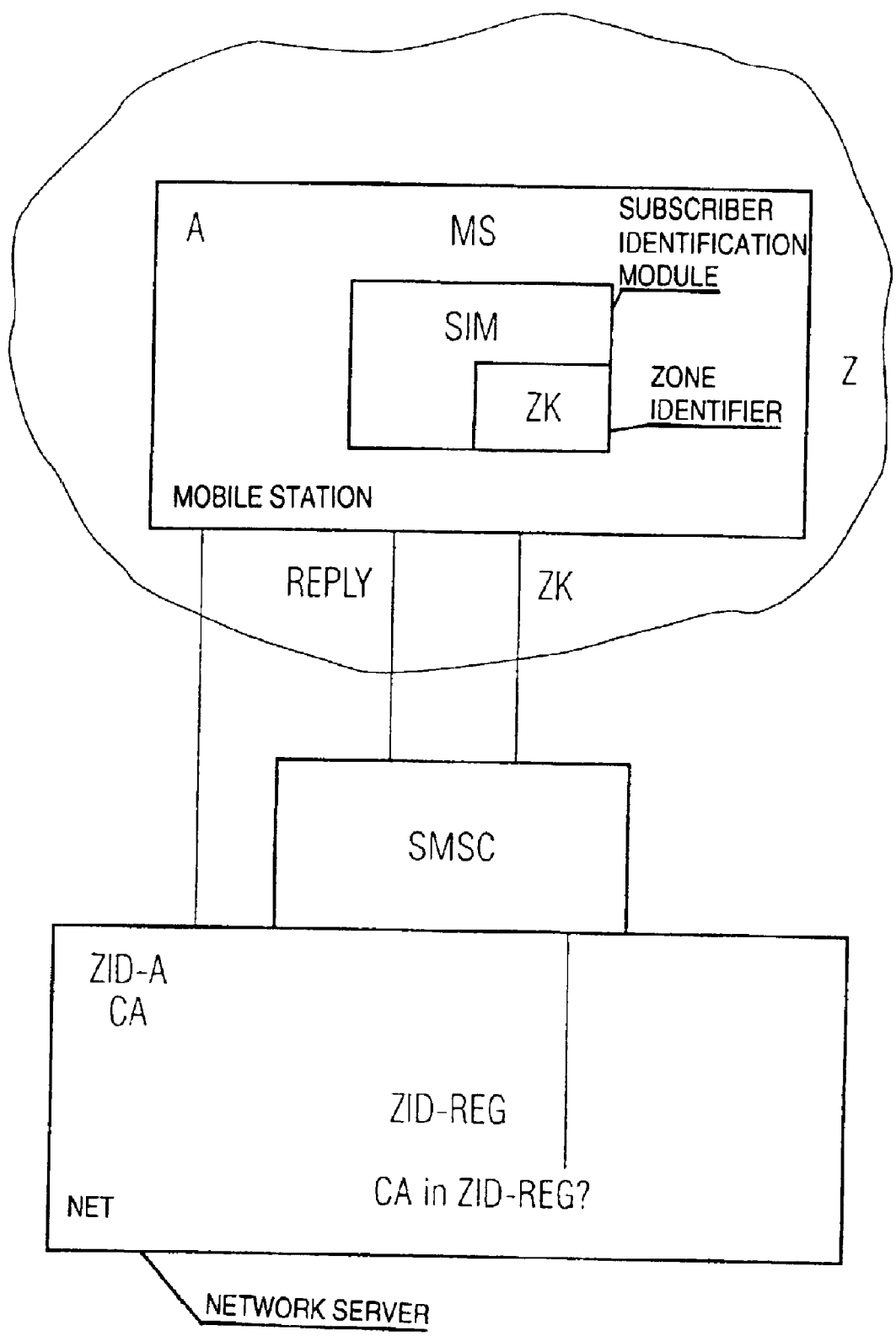
FIG. 3 is a schematic illustration showing a registration procedure for a mobile station MS.

FIG. 3 shows a modified registration procedure for a mobile station MS belonging to a subscriber A within a predefined separate billing zone Z. The network server NET registers the localization of the mobile station MS belonging to the subscriber A within a cell CA and carries out a check to determine whether CA is held within the zone register ZID-REG.

If this is the case, a confirmation REPLY is transmitted to the mobile station MS belonging to the subscriber A.

In addition, a zone identifier ZK is transmitted to the mobile station MS and is stored by the mobile station. Expediently, this can be done within the mobile station's subscriber identification module SIM. When the mobile station registers again, the zone identifier ZK is transmitted to the network server NET and is used as an identifier for an association between the mobile station MS and the separate billing zone Z, irrespective of whether the mobile station in question is currently actually geographically localized within the zone Z. The initial transmission of the zone identifier ZK from the network server NET to the mobile station MS thus represents an initialization procedure.

A plurality of variants are provided, either separately or in combination, for processing the zone identifier ZK between the mobile station MS and the network server NET.

In the case of a first variant, the zone identifier ZK can have a validity period with a time limit only, and/or can be allocated and/or accepted by the network server NET only with a time limit.

In the case of a second variant, the zone identifier ZK is in a form such that it can be stored only in special SIM configurations. Specific allocation of specially configured SIM modules allows the mobile stations MS to be preinitialized without allocating or managing call numbers.

In the case of a third variant, the zone identifier can also already be programmed permanently in a SIM.

When a zone identifier ZK is allocated as the zone identification for the mobile stations MS belonging to the subscribers A and B, the billing is no longer tied to geographically stipulated areas. By contrast, an affiliation identifier for a logistical or other, particularly mobile, organizational structure additionally becomes possible. This is advantageous, by way of example, for mobile structures, such as for a group of externally working employees, conference visitors or such other mobile parts of a company.

Figure 4:
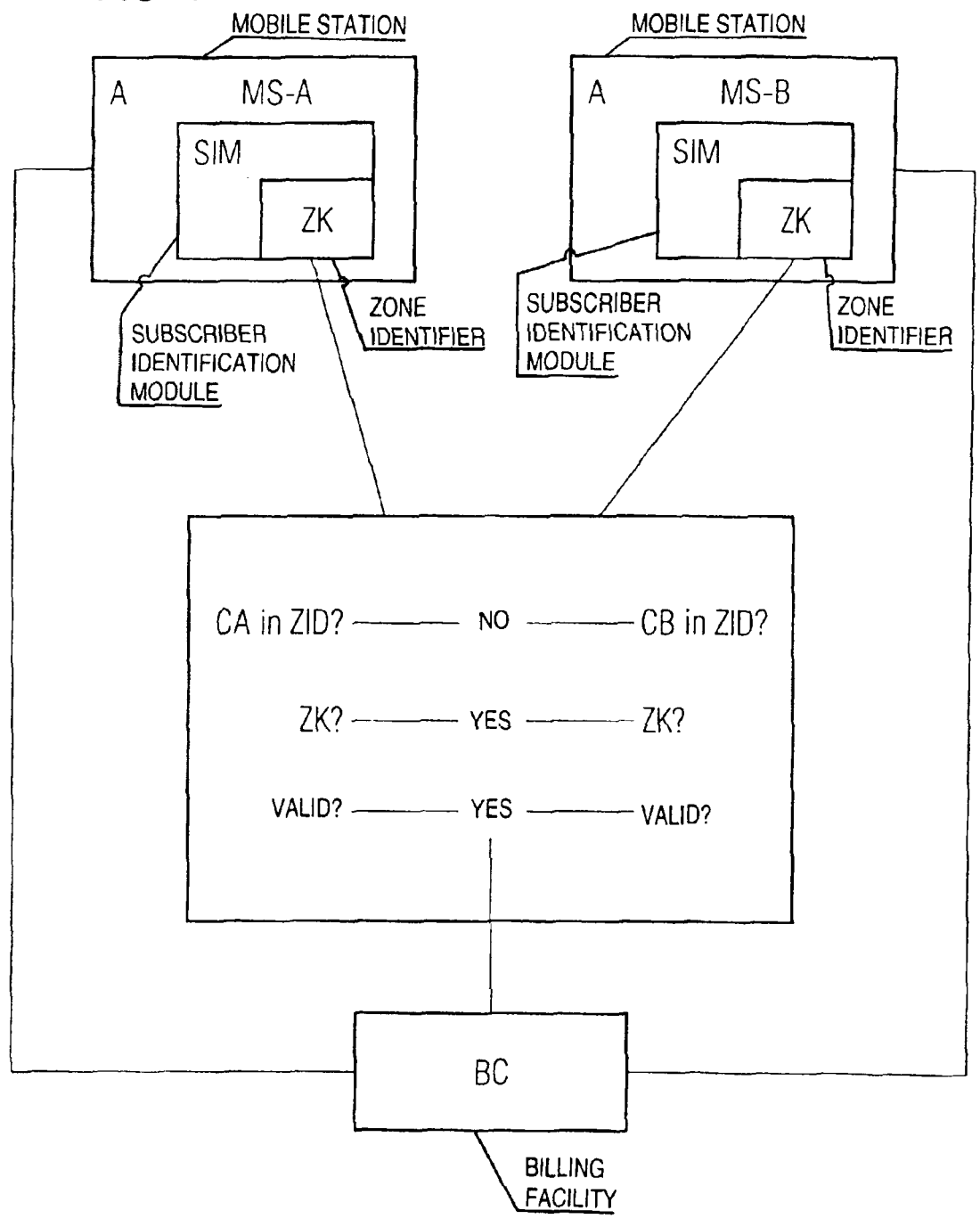
FIG. 4 is a schematic illustration showing billing for communication between mobile stations MS registered by cell identifiers ZK and belonging to two subscribers A and B.

FIG. 4 schematically shows communication KOMM between mobile stations MS that belong to two subscribers A and B and are provided with a zone identifier ZK. The two mobile stations MS belonging to the subscribers A and B can contain their respective zone identifiers ZK permanently programmed in the SIM as the result of the initialization procedure already illustrated or beforehand.

The registration procedures for the respective mobile stations MS involve transmitting the zone identifiers ZK from the respective mobile stations MS to the network server NET. The network server NET localizes the respective mobile stations MS and checks the validity of the zone identifiers ZK for A and B. If one of the subscribers A or B places a call to a respective other subscriber and there is a zone identifier ZK available from both subscribers, the network server NET prompts billing on the basis of a tariff associated with the separate billing zone Z, irrespective of whether A or B are actually localized within the predefined zone Z.

This allows organization-based billing for mobile communication processes between two subscribers A and B as a refinement of zone-based billing. Together with the validity of the zone identifier ZK with a time limit as already mentioned, it is possible to use a mobile station MS for business purposes during a predefined work time, for example, and to allow the subscribers A and B to use it privately otherwise.

I claim:

1. A method for location-based billing for mobile telecommunication, which comprises:

registering mobile stations in a cellular mobile radio network formed by base stations and a network server including at least call-processing facilities, facilities for sending/receiving information, and a billing facility;

recording, forwarding, and transmitting communication information between the mobile stations and/or between the mobile stations and a network server;

forming a special billing zone by combining a subset of radio cells associated with base stations in the cellular mobile radio network and covering a geographical area;

using the billing facility to bill, based on a locally valid tariff for the special billing zone, for communication between ones of the mobile stations temporally concurrently localized within the special billing zone;

storing in a given mobile station a zone identifier as evidence of registration when the given mobile station is registered within the special billing zone; and after re-registering the given mobile station, selecting one of:

questioning the zone identifier stored by the given mobile station with the network server, or transmitting the zone identifier to the network server with the given mobile station.

2. The method according to claim 1, which comprises:

providing a zone register having a collection of cell identifiers defining the special billing zone; and using the network server to manage the zone register and to check whether the ones of the mobile stations are located within the special billing zone by comparing current cell identifiers for the ones of the mobile stations with the zone register.

3. The method according to claim 2, which comprises:

after establishing that a first mobile station is localized within the special billing zone and after the first mobile station initiates a connection setup over the mobile communication network to a second mobile station localized within the special billing zone, using the network server to send a confirmation indicating that the second mobile station is located within the special billing zone.

4. The method according to claim 3, which comprises indicating the confirmation visually and/or audibly on at least one of the first mobile station and the second mobile station.

5. The method according to claim 1, which comprises:

when a first mobile station and a second mobile station are currently involved in a communication and one of the first mobile station and the second mobile station is leaving the special billing zone, sending a notification selected from a group consisting of a visual signal, an audible signal, a text message, and a voice message to at least one of the first mobile station and the second mobile station.

6. The method according to claim 1, which comprises:

if the special billing zone is left during an ongoing communication between a first mobile station and a second mobile station, insuring that the billing facility maintains a tariff associated with the special billing zone at least until the ongoing communication has ended.

7. The method according to claim 1, which comprises:

communicating between at least two mobile stations based on a tariff associated with the special billing zone irrespective of whether the two mobile stations are localized within the special billing zone, provided that at least one of the two mobile stations has transmitted a zone identifier to the network server.

8. The method according to claim 1, which comprises providing the zone identifier with a periodic validity or with a validity having a time limit.

9. The method according to claims 1, which comprises insuring that the given mobile station prescribes the zone identifier without being initialized by the registration procedure.

10. The method according to claim 1, wherein the given mobile station stores the zone identifier on a subscriber identification module.

* * * * *